United States Patent
Yu et al.

(10) Patent No.: US 6,590,038 B2
(45) Date of Patent: Jul. 8, 2003

(54) POLYPROPYLENE RESIN COMPOSITION

(75) Inventors: Young-Hwan Yu, Ulsan (KR);
Tae-Won Whang, Ulsan (KR);
Young-Bong Song, Daejon (KR);
Hun-Uck Chung, Daejon (KR)

(73) Assignees: Hyundai Motor Company, Seoul (KR); LG Caltex Co., Ltd, Seoul (KR)

( * ) Notice: Subject to any disclaimer, the term of this patent is extended or adjusted under 35 U.S.C. 154(b) by 0 days.

(21) Appl. No.: 09/967,628

(22) Filed: Sep. 28, 2001

(65) Prior Publication Data

US 2002/0082328 A1 Jun. 27, 2002

(30) Foreign Application Priority Data

Nov. 1, 2000 (KR) .......................................... 2000-64690

(51) Int. Cl.$^7$ ............................................... C08L 23/10
(52) U.S. Cl. ...................... 525/240; 525/333.7; 525/88; 525/515; 525/387; 525/374; 525/383; 524/451; 524/423; 524/436; 524/425; 524/445

(58) Field of Search ................................. 525/515, 240, 525/88, 333.8; 526/348.2; 524/451, 423, 436, 425, 445, 387, 81, 86, 358, 429, 374, 383

(56) References Cited

U.S. PATENT DOCUMENTS 5,656,691 A * 8/1997 Niki et al. ..................... 525/53
6,153,704 A * 11/2000 Kodama et al. ............. 525/240

* cited by examiner

Primary Examiner—David W. Wu
Assistant Examiner—Rip A. Lee
(74) Attorney, Agent, or Firm—Christie, Parker & Hale, LLP

(57) ABSTRACT

The present invention relates to a polypropylene resin composition and more particularly, to the polypropylene resin composition comprising a high crystalline polypropylene, an ethylene-α-olefin elastomer, an inorganic filler, an organic peroxide and a crosslinking assistant. This polypropylene resin composition exhibits excellent scratch resistance, rigidity, heat resistance, and impact strength and thus, it can be suitable for automobile interior materials such as glove box, console, center crash pad and the like.

12 Claims, No Drawings

POLYPROPYLENE RESIN COMPOSITION

CROSS-REFERENCE TO RELATED APPLICATION

This application claims priority of Korea patent Application No. 2000-64690, filed on Nov. 1, 2000.

BACKGROUND OF THE INVENTION

1. Field of the Invention

The present invention relates to a polypropylene resin composition and more particularly, to the polypropylene resin composition comprising a high crystalline polypropylene, an ethylene-α-olefin elastomer, an inorganic filler, an organic peroxide and a crosslinking assistant. This polypropylene resin composition exhibits excellent scratch resistance, rigidity, heat resistance, and impact strength and thus, it can be suitable for automobile interior materials such as glove box, console, center crash pad and the like.

Conventional polypropylene resin composition has been widely used in automobile interior materials such as various pillar as well as exterior materials such as a bumper due to its excellent formability, impact resistance chemical resistance, low viscosity and low cost.

However, it is required to satisfy both scratch resistance and impact resistance to use in automobile interior material such as glove box, console, center crash pad and the like. Though conventional polypropylene resin composition has good physical properties such as impact resistance and rigidity, there is no such a product satisfying both said properties, scratch resistance and impact resistance.

Hitherto, it is common practice to use the polypropylene resin graded to several tens in accordance with the intended use. In this case, it needs extra painting process to satisfy both impact resistance and scratch resistance, resulting in cost increase.

Therefore, development of the polypropylene resin having superior impact resistance and scratch resistance is highly demanded in the automobile industry.

SUMMARY OF THE INVENTION

There are some disadvantages in that the cost is high and it requires additional painting process to increase scratch resistance because of the use of polypropylene resin graded to several tens in the conventional automobile industry.

Therefore, an object of the present invention is to provide a polypropylene resin composition having excellent impact strength and scratch resistance, which is suitable for automobile interior materials, by incorporating typical polypropylene resin with a propylene homopolymer and/or ethylene-propylene block copolymer, ethylene-α-olefin elastomer, organic peroxide, crosslinking assistant and inorganic filler.

DETAILED DESCRIPTION OF THE INVENTION

The present invention provides a polypropylene resin composition comprising:

(A) 30–70 wt. % of polypropylene resin comprising propylene homopolymer, ethylene-propylene block copolymer, or a mixture thereof;
(B) 10–30 wt. % of ethylene-α-olefin elastomer;
(C) 10–40 wt. % of an inorganic filler;
(D) 0.01–0.2 wt. % of an organic peroxide based to 100 wt. % of said polypropylene resin (A); and
(E) 0.06–1.2 wt. % of a crosslinking assistant based to 100 wt. % of said polypropylene resin (A).

The present invention is described with detailed description of each component as set forth hereunder.

(A) Component

High crystalline polypropylene is used to enhance rigidity, heat resistance, chemical resistance and formability of the polypropylene composition of the present invention. This high crystalline polypropylene is used having pentad fraction (% mmmm) measured by $^{13}$C-NMR higher than 96%, preferably higher than 97%. If the pentad fraction is below 96%, the rigidity and heat resistance are degraded. And further, said high crystalline polypropylene of this invention may be propylene homopolymer, ethylene-propylene block copolymer, or a mixture thereof.

Also, for said high crystalline propylene homopolymer, the one with melt index of from 2 to 15 g/10 min and intrinsic viscosity [η] measured in 135° C. of decalin in the range of from 1.0 to 3.0 dL/g, preferably in the range of from 1.5 to 2.5 dL/g, is used. If the intrinsic viscosity [η] is below 1.0 dL/g, the impact strength worsens; otherwise if it exceeds 3.0 dL/g, the formability worsens.

For said ethylene-propylene rubber of ethylene-propylene block copolymer, the one with intrinsic viscosity [η] of higher than 3.0 dL/g, preferably higher than 4.0 dL/g, is used. If the intrinsic viscosity [η] is below 3.0 dL/g, the impact strength is rapidly. Said high crystalline polypropylene may be used alone or as a mixture of propylene homopolymer and ethylene-propylene block copolymer. And ethylene-propylene rubber of sad ethylene-propylene block copolymer contains more than 70% of the propylene homopolymer content, preferably more than 80%, to obtain desired impact resistance and flexibility. Said high crystalline polypropylene is used in 30–70 wt. % based to the entire polypropylene resin composition, preferably in 45–65 wt. %. If the content exceeds 70 wt. %, the impact strength is degraded; otherwise if it is below 30 wt. %, the formability is degraded.

(B) Component

Even though the polypropylene resin of (A) component provides excellent impact resistance due to high crystalline property, there are some disadvantages in that cracks or bending in the product can occur due to large changes in volume during cooling process after molding process, rapid molding shrinkage can also occur during injection process, and impact strength is deficient at low temperature.

Therefore, the ethylene-α-olefin elastomer of the present invention is used in order to solve such problems. A preferred ethylene-α-olefin elastomer of the present invention is a mixture of ethylene-propylene rubber (hereinafter referred to as "EPR") and ethylene-octene elastomer (hereinafter referred to as "EOM").

EPR having a melt index of 0.3–10 g/10 min is preferred to use, and more preferably 0.5–5 g/10 min. If said melt index is less than 0.3 g/10 min, appearance and mechanical properties of the molded product are degraded because the dispersion becomes poor during the molding process. On the other hand, in case of exceeding 10 g/10 min, impact resistance is decreased due to excess use of the elastomer. Physical properties of the EPR can be changed with comprised amount of propylene which is preferable in the range of from 20 to 70 wt. %, more preferably in the range of from 40 to 60 wt. %. If the amount exceeds 70 wt. % rigidity worsens; otherwise if it is less than 20 wt. %, impact strength becomes poor.

The use of EPR in the present invention increases the impact strength of the entire polypropylene resin composition, but it can also affect to degrade the rigidity. Thus, it is required to use another ethylene-olefin elastomer (EOM) to complement this problem. For this purpose, EOM having a Mooney viscosity $ML_{1+4}$ (121° C.) of 1–50 dL/g, and the density of 0.86–0.91 g/cm³, preferably 0.87–0.90 g/cm³, is used. And further, it is preferred to use EOM containing 15–45 wt. % of $C_8$ (octane), more preferably 25–35 wt. %.

These two elastomers are used to complement each other, and a preferred compounding ratio (EPR:EOM) is in the of from 20:80 to 80:20 wt. %, preferably from 60:40 to 40:60 wt. %. The content of this mixture incorporated is 10–30 wt. % to the entire polypropylene resin composition, preferably 15–25 wt. %. If the content exceeds 30 wt. %, the rigidity and formability are inferior; otherwise if it is below 10 wt. %, the impact strength is degraded.

(C) Component

An inorganic filler is used to improve tensile strength and impact strength and lower cost to the polypropylene resin composition of the present invention. It is preferred to use the filler having an average particle size of from 0.5 to 7 μm and when the particle size is smaller than 0.5 μm, the dispersion of the resin becomes degraded; otherwise if it is larger than 7 μm, cracks are formed due to large particle size and the impact strength is inferior and thus, it does not provide the desired physical properties. The inorganic filler is used in 10–40 wt. % to the entire polypropylene resin composition. If the content is below 10 wt. %, the rigidity and heat resistance worsen; otherwise if it exceeds 40 wt. %, the impact resistance worsens. Examples of the inorganic filler are talc, barium sulfate, calcium carbonate and wollastonite.

(D) Component

The polypropylene resin composition of the present invention are improved in the impact strength and rigidity by adding the components (A) and (B), but lowered in the scratch resistance. Thus, a practical use of such a resin composition is limited to the automobile interior materials. Therefore, the present invention has introduced to crosslink the surface of polypropylene resin composition to increase the rigidity of the surface and improve scratch resistance.

An organic peroxide which is used to initiate the crosslinking of the polypropylene resin composition is supposed to have a half-life of about 1 min, preferably 50–70 sec and a degradation temperature of 150–270° C. The organic peroxide content is preferably in the range of 0.01–0.2 wt. % to 100 wt. % to the polypropylene resin (A), more preferably 0.02–0.1 wt. %. If the amount is less than 0.01 wt. %, the improved scratch resistance is unsatisfactory due to low reactivity. If it is more than 0.2 wt. %, the flowability difference of the polypropylene resin composition is too much with increased reactivity and thus, the quality of the product is impaired. Such an organic peroxide can be easily used by one having ordinary skill in the art.

(E) Component

A crosslinking assistant is used to enhance scratch resistance of the polypropylene resin composition with the component (D). Said crosslinking assistant is preferably in the range of from 0.06–1.2 wt. % to 100 wt. % to the polypropylene resin (A) and the compounding ratio of the crosslinking assistant/the organic peroxide is preferably 3–12, more preferably 4–10. If the compounding ratio is less than 3, the degradation has priority, so that the properties become inferior; otherwise if it exceeds 12, the desired properties may not be expected. Typical crosslinking assistant is selected from divinyl compound, maleimide compound and quinone dioxime compound.

Other additives, used by one having ordinary skill in the art, such as an anti-oxidant, a neutralizer, an anti-static agent, and a nucleating agent may be arbitrarily incorporated in an appropriate content not to obstruct the above-mentioned object of the present invention. Examples of anti-oxidant are phenols, phosphates, and thiodipropionate synergists and examples of neutralizer are calcium stearate and zinc oxide.

The polypropylene resin composition comprises the components (A) to (E) in the respective prescribed amount and if desired, an additional additive, and has a melt index of 3–40 g/10 min. When it is lower than 3 g/10 min, processability may be degraded and the flow mark of the product may occur. On the other hand, when it is higher than 40 g/10 min, physical properties such as strength, rigidity, and impact strength become poor.

The method for preparing the polypropylene resin composition of the present invention is not limited to any special method, and it can be prepared by conventional mechanical mixing, pelletizing and molding process. To be specific, general melting mixers like Banbury mixer, single-screw extruder, double-screw extruder and multiwheel screw extruder can be used. The mixing temperature is recommended to be 180–270° C. to mix uniformly the components (A) to (E) and other additives, if desired. The resin composition of the present invention can be subjected to the production by any of various molding techniques including extrusion, blow molding injection molding, and sheet molding. Of these molding techniques, injection molding is preferably used. Many post-treatment can be performed to improve the quality of automotive materials formed from these forming methods.

Hereunder is given a more detailed description of the present invention using examples. However, it should not be construed as limiting the scope of this invention.

EXAMPLES 1–6

Comparative Examples 1–8

The polypropylene resin composition comprising polypropylene resin (A) comprising propylene homopolymer and ethylene-propylene block copolymer; an ethylene-α-olefin elastomer (B) comprising ethylene-propylene elastomer (EPR) and ethylene-octene elastomer (EOM); an inorganic filler (C); an organic peroxide (D); and a crosslinking assistant (E) with a ratio and amount listed in tables 1–4 was mixed with the mixing ratio listed in table 5 by means of Henschel mixer (trade name). The resulting mixture was melt-kneaded with twin-screw extruder and then pelletized.

TABLE 1

Polypropylene homopolymer and ethylene-propylene block copolymer (A)

| (A) | Melt index (g/10 min) | Intrinsic viscosity ([η], dL/g) | [3]$E_c$ (wt. %) | [4]$R_c$ (wt. %) |
|---|---|---|---|---|
| [1]PP-1 | 2 | 2.7 | — | — |
| [1]PP-2 | 8 | 1.9 | — | — |
| [1]PP-3 | 14.5 | 1.3 | — | — |
| [2]PP-4 | 4 | 4.3 | 60 | 15 |
| [2]PP-5 | 8 | 3.6 | 60 | 15 |

[1]PP-1, PP-2 & PP-3: Propylene homopolymer
[2]PP-4 & PP-5: ethylene-propylene block copolymer
[3]$E_c$: Ethylene Content of ethylene-propylene rubber
[4]$R_c$: Xylene Extract Content In Table 1, the melt index of the component (A) was measured with ASTM D1238 (230° C./2.16 kg) and intrinsic viscosity of propylene homopolymer (PP-1, PP-2 & PP-3) are measured with Ubbeholde viscometer. The ethylene content ($E_c$) of ethylene-propylene rubber (PP-4 & PP-5) was determined with FT-IR; and the Xylene Extract Content (Rc) and intrinsic viscosity [η] were determined in 135° C. of decalin.

TABLE 2

Ethylene-propylene rubber (EPR) and ethylene-octene elastomer (EOM) (B)

| (B) | Melt Index (g/ 10 min) | $C_c$ (wt. %) | Mooney viscosity ($ML_{1+4}$, 50 dL/g) |
|---|---|---|---|
| EPR-1 | 3.5 | 31 | — |
| EPR-2 | 0.5 | 35 | — |
| EOM-1 | — | 24 | 23 |
| EOM-2 | — | 24 | 8 |

The comonomer content of EPR and EOM of the component (B) was determined with FT-IR and Mooney viscosity was determined with ASTM D1646 at 121° C.

TABLE 3

Inorganic filler (C)

| (C) | Particle diameter (μm) |
|---|---|
| T-1 | 2.9 |
| T-2 | 7.6 |

The inorganic filler used in the present invention is talc and an average particle diameter thereof was measured with laser sedimentation method.

TABLE 4

Organic peroxide (D) and Crosslinking assistant (E)

| (D) | PO-1 | 1,3-bis(t-butylpeoxyisopropyl)benzene |
| | PO-2 | 2,5-dimethyl-2,5-di(t-butylpeoxy)hexane |
| (E) | CA-1 | Divinylbenzene |
| | CA-2 | p-quinone dioxime |

TABLE 5

| | | Composition (wt. %) | | | *Composition (parts by weight) | |
| Items | | A | B | C | D | E |
|---|---|---|---|---|---|---|
| Exam. | 1 | PP-1: 70 | EPR-1: 10 | T-1: 20 | PO-1: 0.05 | CA-1: 0.3 |
| | 2 | PP-1: 70 | EPR-1: 5 EOM-1: 5 | T-1: 20 | PO-1: 0.05 | CA-1: 0.3 |
| | 3 | PP-2: 70 | EPR-1: 5 EOM-1: 5 | T-1: 20 | PO-1: 0.05 | CA-1: 0.3 |
| | 4 | PP-4: 75 | EPR-1: 5 | T-1: 20 | PO-1: 0.05 | CA-1: 0.3 |
| | 5 | PP-1: 70 | EPR-1: 5 EOM-1: 5 | T-1: 20 | PO-2: 0.05 | CA-1: 0.3 |
| | 6 | PP-1: 70 | EPR-1: 5 EOM-1: 5 | T-1: 20 | PO-2: 0.05 | CA-2: 0.3 |
| Com. Exam. | 1 | PP-1: 70 | EPR-1: 10 | T-1: 20 | — | — |
| | 2 | PP-1: 70 | EPR-1: 10 | T-1: 20 | PO-2: 0.05 | CA-1: 0.1 |
| | 3 | PP-1: 70 | EPR-1: 10 | T-2: 20 | PO-1: 0.05 | CA-1: 0.3 |
| | 4 | PP-1: 70 | EPR-2: 10 | T-1: 20 | PO-1: 0.05 | CA-1: 0.3 |
| | 5 | PP-1: 70 | EOM-1: 10 | T-1: 20 | PO-1: 0.05 | CA-1: 0.3 |
| | 6 | PP-3: 70 | EPR-1: 5 EOM-2: 5 | T-1: 20 | PO-1: 0.05 | CA-1: 1.0 |
| | 7 | PP-5: 75 | EPR-1: 5 | T-1: 20 | PO-1: 0.05 | CA-1: 0.3 |
| | 8 | PP-1: 65 | EPR-1: 15 | T-1: 20 | PO-1: 0.05 | CA-1: 0.3 |

*The amount used based on 100 parts by weight of polypropylene resin (A)

Testing Example: Test of Physical Properties

Physical properties of the polypropylene resin composition prepared from Examples 1–6 and Comparative Examples 1–8 were tested by the following method. The result is shown in Table 6.

[Test Method]

A. Melt index (MI, g/10 min): Tested with ASTM D1238 (230° C./2.16 kg)

B. Izod impact resistance (kg·cm/$cm^2$): Tested with ASTM D256 at 23° C.

C. Flexural modulus (kg/$cm^2$): Tested with ASTM D790A

D. Thermal deflection temperature (° C.): Tested with ASTM D648

E. lead hardness of pencil: Tested with JIS K5401-1969 at 23° C.

TABLE 6

| Items | | Melt Index (g/10 min) | Izod Impact Resistance (kg.cm/cm²) | Flexural Modulus (kg/cm²) | Thermal Deflection Temp. (° C.) | Lead hardness of pencil |
|---|---|---|---|---|---|---|
| Exam. | 1 | 8.6 | 24 | 27,000 | 134 | 2B |
| | 2 | 5.9 | 28 | 26,500 | 134 | 2B |
| | 3 | 7.6 | 21 | 26,500 | 133 | 2B |
| | 4 | 6.3 | 27 | 24,500 | 128 | 3B |
| | 5 | 6.5 | 26 | 27,000 | 131 | 2B |
| | 6 | 5.4 | 32 | 26,000 | 134 | 2B |
| Com. Exam. | 1 | 2.2 | 23 | 24,000 | 131 | 5B |
| | 2 | 13.8 | 12.6 | 25,500 | 132 | 4B |
| | 3 | 7.3 | 14 | 26,000 | 133 | 2B |
| | 4 | 3.1 | 18 | 27,000 | 135 | 2B |
| | 5 | 1.2 | 36 | 27,500 | 135 | 2B |
| | 6 | 14.7 | 13 | 25,500 | 135 | 2B |
| | 7 | 9.5 | 17 | 23,500 | 124 | 3B |
| | 8 | 4.7 | 36 | 22,000 | 126 | 4B |

As shown in Table 6, the polypropylene resin composition of the present invention has superior impact resistance, rigidity and scratch resistance. In contrast, for Comparative Example 1 without introduction of a crosslinking assistant and Comparative Example 2, the scratch resistance is poor; for Comparative Example 3, the impact resistance lowered due to use of talc having too large particle diameter; Comparative Examples 4–5, the fluidity is poor because of the low melt index of elastomer blender; for Comparative Example 6, the impact resistance and elasticity become also poor because of the high melt index of elastomer blender; for Comparative Example 7, the balance between impact resistance and rigidity becomes poor because of the use of polypropylene rein having high melt flow rate, resulting in inferior physical properties of the molded article; and for Comparative Example 8, rigidity and scratch resistance become degraded because of excess use of EPR.

As described in detail above, the present invention provides polypropylene resin composition having excellent scratch resistance and well-balanced combination of impact resistance and rigidity, so that it can be suitable for the molding of automobile interior materials including glove box, console, center crash pad, and the like.

What is claimed is:

1. A polypropylene resin composition comprising:
   (A) 30–70 wt. % of polypropylene resin comprising a mixture of propylene homopolymer having a pentad fraction (% mmmm) measured by $^{13}$C-NMR higher than 96% and a intrinsic viscosity of 1.0–3.0 dL/g and ethylene-propylene block copolymer having a intrinsic viscosity of above 3.0 dL/g;
   (B) 10–30 wt. % of ethylene-α-olefin elastomer;
   (C) 10–40 wt. % of an inorganic filler;
   (D) 0.01–0.2 wt. % of an organic peroxide based to 100 wt. % of said polypropylene resin (A); and
   (E) 0.06–1.2 wt. % of a crosslinking assistant based to 100 wt. % of said polypropylene resin (A).

2. The polypropylene resin composition according to claim 1, wherein said ethylene-α-olefin elastomer (B) is a mixture of ethylene-propylene rubber and ethylene-octene elastomer mixed in a compounding ratio of 20:80 to 80:20 (ethylene-propylene rubber:ethylene-octene elastomer).

3. The polypropylene resin composition according to claim 1, wherein said inorganic filler (C) is selected from the group consisting of talc, barium sulfate, calcium carbonate and wollastonite having an average particle diameter of 0.5–0.7 μm.

4. The polypropylene resin composition according to claim 1, wherein said organic peroxide (D) has a half-life of 50–70 sec and a degradation temperature of 150–270° C.

5. The polypropylene resin composition according to claim 1, wherein said crosslinking assistant is selected from the group consisting of divinyl compound, maleimide compound and quinone dioxime compound.

6. The polypropylene resin composition according to claim 1, wherein a compounding ratio of said crosslinking assistant to said organic peroxide is in the range of 3 to 12.

7. A polypropylene resin composition comprising:
   (A) 30–70 wt. % of polypropylene resin comprising propylene homopolymer, ethylene-propylene block copolymer, or a mixture thereof;
   (B) 10–30 wt. % of ethylene-α-olefin elastomer comprising a mixture of ethylene-propylene rubber and ethylene-octene elastomer mixed in a compounding ratio of 20:80 to 80:20 (ethylene-propylene rubber:ethylene-octene elastomer);
   (C) 10–40 wt. % of an inorganic filler;
   (D) 0.01–0.2 wt. % of an organic peroxide based to 100 wt. % of said polypropylene resin (A); and
   (E) 0.06–1.2 wt. % of a crosslinking assistant based to 100 wt. % of said polypropylene resin (A).

8. The polypropylene resin composition according to claim 7, wherein said polypropylene resin (A) is a mixture of propylene homopolymer having a pentad fraction (% mmmm) measured by $^{13}$C-NMR higher than 96% and a intrinsic viscosity of 1.0–3.0 dL/g and ethylene-propylene block copolymer having a intrinsic viscosity of above 3.0 dL/g.

9. The polypropylene resin composition according to claim 7, wherein said inorganic filler (C) is selected from the group consisting of talc, barium sulfate, calcium carbonate and wollastonite having an average particle diameter of 0.5–0.7 μm.

10. The polypropylene resin composition according to claim 7, wherein said organic peroxide (D) has a half-life of 50–70 sec and a degradation temperature of 150–270° C.

11. The polypropylene resin composition according to claim 7, wherein said crosslinking assistant is selected from the group consisting of divinyl compound, maleimide compound and quinone dioxime compound.

12. The polypropylene resin composition according to claim 7, wherein a compounding ratio of said crosslinking assistant to said organic peroxide is in the range of 3 to 12.

* * * * *